UNITED STATES PATENT OFFICE.

HARRY B. COX, OF CINCINNATI, OHIO.

ELECTRIC BATTERY.

SPECIFICATION forming part of Letters Patent No. 350,294, dated October 5, 1886.

Application filed May 3, 1886. Serial No. 200,999. (No specimens.)

*To all whom it may concern:*

Be it known that I, HARRY B. COX, of Cincinnati, in the county of Hamilton and State of Ohio, have invented certain new and useful Improvements in Electric Batteries; and I do hereby declare that the following is a full, clear, and exact description of the invention, which will enable others skilled in the art to which it appertains to make and use the same.

The object of my invention is to produce a simple battery element which shall be capable of withstanding the effect of frequent or careless handling, and can be readily transported when in complete working order, or may be placed in any position, even completely inverted, without affecting its value as a generator or changing the position of the electrodes. Furthermore, it will incidentally possess other advantages which will appear hereinafter.

To this end my invention consists in a battery element having its exciting fluid or fluids thickened to the consistency of jelly by some substance not detrimental to the chemical action, said fluid being capable of fermentation.

The electrodes and the exciting fluid or fluids may be such as are generally known and used in primary batteries. I add to the exciting fluid or fluids a certain proportion of gelatine, corn-starch, corn-meal, or any similar substance, or several of them not detrimental to the chemical action of the exciting fluid or fluids. Enough should be added to bring the mixture to the consistency of a thick paste or jelly, so that it will retain its form in whatever position the cell may be placed. The mixing may be effected either before or after the exciting fluid or fluids have been poured into the cell. In either case the electrodes will be enveloped in the mixture, and will be retained in their relative positions irrespective of the treatment to which the battery-cell may be subjected or of the position in which it may be placed. This makes an especially-valuable battery element for use upon railway-trains, or steamships, or in laboratory work, where it is frequently necessary to move a battery about. Furthermore, although the mixture possesses sufficient moisture to act freely upon the electrodes, it is yet less liable to freeze than an ordinary cell. Should a low vegetable substance be used to effect the thickening, it will ferment when moistened, thereby increasing the quickening effect of the exciting fluid or fluids, and thus augmenting the strength of the battery.

I am aware that a German patent, No. 35,398, of 1885, describes a battery element having its exciting fluid thickened by a mixture of glycerine, gelatine, water, and salicylic acid; but this composition will not ferment, by reason of the presence of the salicylic acid, and so will not assist the action of the exciting fluid. It might, indeed, be positively detrimental thereto. I do not therefore claim the composition described in the aforesaid German patent; but

What I claim is—

A battery element having its exciting-fluid thickened to the consistency of jelly by gelatine, or its equivalent, so as to admit of fermentation, and thereby assist in the action of the exciting-fluid.

In testimony that I claim the foregoing as my own I affix my signature in presence of two witnesses.

HARRY B. COX.

Witnesses:
GEO. F. BELDEN,
O. E. DUFFY.